Figure 1:
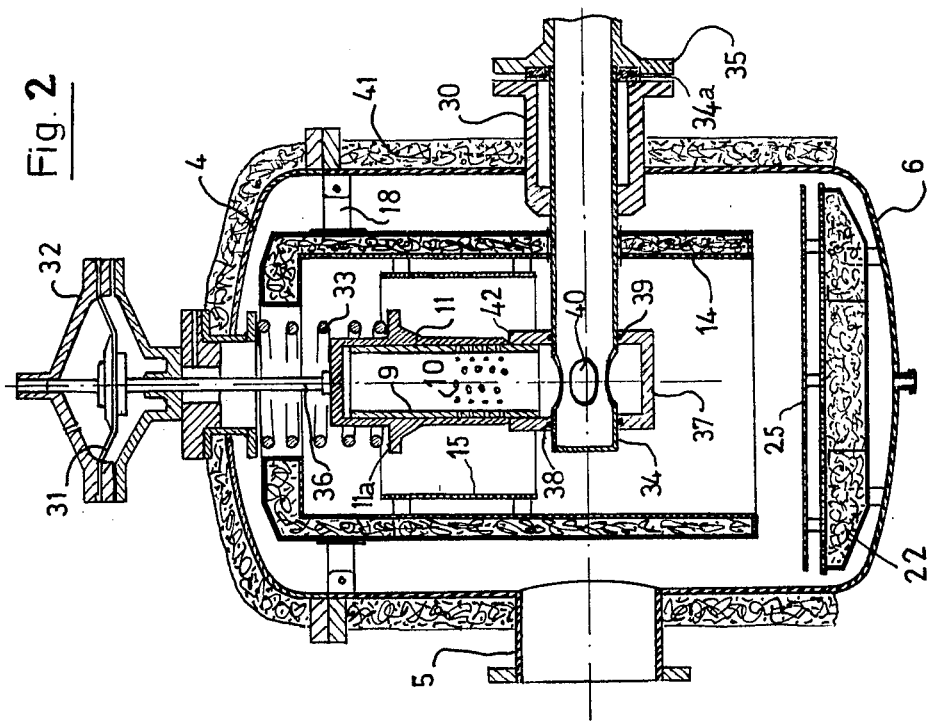

United States Patent [19]
Duthion et al.

[11] 4,103,702
[45] Aug. 1, 1978

[54] SOUND PROOFED VALVE FOR FLUID UNDER PRESSURE

[75] Inventors: Louis Duthion; Pierre Bonnet, both of Paris; Paul Amand Louis Coudray, Les Clayes-sous-Bois, all of France

[73] Assignee: Bertin & Cie, Plaisir, France

[21] Appl. No.: 697,216

[22] Filed: Jun. 17, 1976

[30] Foreign Application Priority Data

Jun. 20, 1975 [FR] France .................... 75 19305

[51] Int. Cl.² ........................... F16K 47/02
[52] U.S. Cl. ................... 137/375; 137/625.3; 181/277
[58] Field of Search ............... 137/625.3, 375; 181/45, 181/64 A

[56] References Cited

U.S. PATENT DOCUMENTS

| 1,291,271 | 1/1919 | Tredt | 181/64 A |
| 3,137,365 | 6/1914 | Bingel | 181/64 A |
| 3,693,659 | 9/1972 | Parola | 137/625.3 |
| 3,802,537 | 4/1974 | White | 137/625.3 X |

Primary Examiner—Arnold Rosenthal
Attorney, Agent, or Firm—A. W. Breiner

[57] ABSTRACT

The invention comprehends a sound proofed valve for fluid under pressure, comprising a movable obturator for progressively uncovering a series of fluid expansion orifices positioned inside an expansion area, a sound proofing means also positioned inside said expansion area and located opposite fluid jets issuing, in operation of said valve, from said orifices, and a permeable splash guard obstacle placed between said orifices and said sound proofing means and spaced from said sound proofing means.

5 Claims, 2 Drawing Figures

SOUND PROOFED VALVE FOR FLUID UNDER PRESSURE

This invention concerns a sound proofed valve for fluid under pressure.

The sound proofed valve in accordance with the invention is applicable to the control and possible shutting off of the entire flow of fluid circulating in a conduit or escaping to atmosphere, whether the said fluid be liquid or gaseous, and in particular in the chemical and iron and steel industry and in the fields of transport and the distribution of gas.

This valve may be controlled manually or by a servomotor, for example by a deformable diaphragm subjected to a control pressure. Thus, it can be utilized as a constituent part of a fluid expander, such expanders which currently serve for the delivery of a flow at constant pressure, being made silent by the use of a valve in accordance with the invention.

In fact, the invention aims at obtaining a control valve which is more silent than known valves whilst being durable and easy to maintain.

From, for example, British Pat. No. 639073 of K. B. Hopfinger filed in 1948, the advantage is already known in stop-cocks which can be opened progressively and which utilize a movable obturator sliding along an element pierced by a series of orifices which are uncovered progressively by the obturator whilst not creating a pulsating flow. This obturator is generally a cylindrical sleeve co-operating externally or internally with a sheath or strainer pierced with orifices which are often disposed in an helicoidal series but which may also be narrow slots.

By their French Pat. No. 1551128, the applicants have shown that the addition of internal sound proofing means in the area of expansion and in particular at the outlet from such orifices, furthermore introduces a very silent operation of the valves or stop-cocks of this type. Such internal sound proofing means generally comprise a permeable rigid lining, for example a network, perforated sheet metal or porous metal and a layer of sound proofing material generally cellular or fibrous, retained by the said lining against the inner wall of the expansion area.

However, the applicants have not been able to utilize this invention in a very satisfactory manner because the expansion jets issuing from the series of orifices become broken up against the internal sound proofing means and pass through the network or even the perforated metal sheet whilst destroying little by little the sound proofing material, especially if it is fibrous.

Consequently, and even for expansion levels which are quite high, they have been forced to use the device described in British Pat. No. 1,354,239 where a metal sheet forming a baffle protects the inner sound proofing core from the said expansion jets.

Nevertheless, the sound proofing effect is noticeably reduced by the said metal sheet since the latter reflects sounds and can itself enter into vibrations which it transmits to the walls of the expansion area and to the whole of the structure.

In order to simultaneously obtain optimum values of sound proofing and durability, a valve in accordance with the invention comprises, as indicated, a movable obturator which progressively uncovers a series of expansion orifices, and internal sound proofing means in the area of expansion and opposite the jets issuing from the series of orifices, and is characterized by a permeable splash guard obstacle situated between the said orifices and the said sound proofing means at a distance from the latter.

This splash guard obstacle being permeable, that is to say discontinuous, it does not reflect sounds and has no tendency to begin to vibrate.

It is generally provided by means of a perforated sheet disposed far enough away from the orifices so as not to impair the expansion.

Small individual obstacles could also be disposed opposite each jet although that is generally more costly and fragile.

A preferred embodiment of the invention comprises a cylindrical assembly combining a splash guard and sound proofing means, an assembly which surrounds a cylindrical sheath where the expansion orifices are pierced, and being itself co-axial with the expansion area and separated from the latter by an annular passage for the expanded fluid in such a manner as to serve the purpose of a sound proofing baffle in the path of the said fluid.

Advantageously, this assembly is removable to permit its possible maintenance or cleaning. It is completed by a sound proofing means at the base of the annular passage, a means also capable of being improved by a similar splash guard preventing at the same time deterioration of the sound proofing material under the action of the current of expanded gas which strikes against the said base.

It has been pointed out, that fibrous materials are especially sensitive to the impact of currents of gas. Although to a lesser degree, there are likewise other materials such as honeycomb or other combinations sometimes employed as shock absorbing supports of the resonator type, since these materials are of metal or very thin plastics material. Thus, they are also capable of improvement by the application of a splash guard in accordance with the invention.

Figure 2:
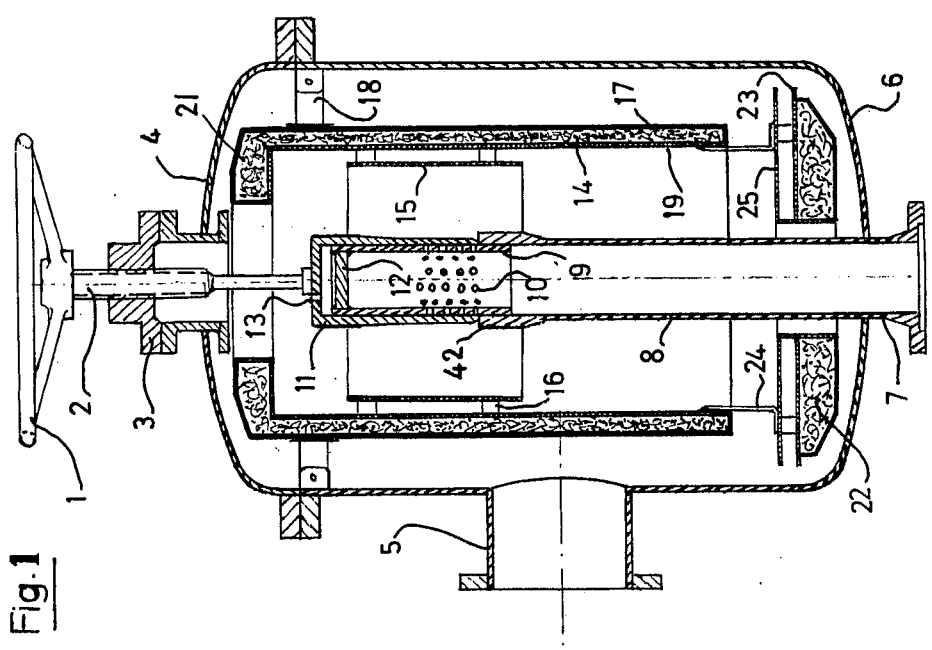

The accompanying FIGS. 1 and 2 and their descriptions concern non-limiting embodiments of the invention illustrated by way of example. They show, in section, control valves used in the chemical industry.

In these Figures, elements having the same function are provided with the same references.

FIG. 1 is a steam expansion valve with a manual control by means of a wheel 1 with a screw 2, which passes through a flange 3 having sufficient fluid tightness bolted to the removable cover 4 of the valve body 6 resistant to the expanded steam pressure which is evacuated by the outlet tube 5.

The inlet tube 7 for steam at high pressure is extended along the axis of the screw 2 by a tube 8 inside the body and which carries, in known manner, a sheath 9 in which are pierced expansion orifices such as 10, while a movable sleeve 11 fixed to an extension of the screw 2 enables the expansion orifices 10 to be uncovered at will and progressively by operating the wheel 1. The sheath 9 is closed by a soldered disc 12 whilst the sleeve 11 comprises an orifice 13 which balances the pressures and avoids the reaction of the high pressure on the screw 2 so as to permit an easy manipultation by the wheel 1.

According to the invention, a sound proofing assembly 14 is interposed between the expansion device 9, 10, 11 and the body 6 and it is protected opposite the orifices 10 by a splash guard 15. In this instance the latter is constituted by a perforated sheet for example of 2 millimeters in thickness with holes of 4 millimeters in diameter at a pitch of 8 millimeters and it is fixed by brackets such as 16 to the assembly 14 at a distance of approximately 10 millimeters but which can be varied within large limits for example between 5 millimeters and 30 millimeters. It will be noted that the holes in the perforated sheet of the splash guard 15 must be smaller and more numerous the nearer the latter is to the orifices such as 10, since it is necessary to prevent a jet issuing from one of these orifices from passing directly through one of the holes and risking deterioration of the sound proofing assembly 14.

The latter is constituted, for example, by a support ferrule 17 in the form of a solid sheet fixed to the valve body 6 by means of clips 18 which can be dismantled. This ferrule is soldered to a counter ferrule 19 of network or perforated sheet with turned down edges and the space between them is filled with a mass of sound proofing fibre resistant to gases or to the temperature of the steam for example glass wool and glass cloth.

Turned down edges of the ferrule and of the counter ferrule, also filled with fibre, form a sound proofing base 21 towards the removable cover 4 of the valve, while another base 22 with a double perforated sheet 23 and 25 similar to the previous one, prevents the transmission of sound at the bottom of the valve. The sound proofing base 22 can be fixed to the previous cylindrical sound proofing assembly by means of brackets 24 in such a manner that the base and the cylindrical assembly can be withdrawn together by dismantling of the cover 4 and of the clips 18.

The assembly 14 masks the orifice of the outlet tube 5, which ensures optimul sound proofing and the gas or the expanded steam consequently passes round the lower end of the said assembly and strikes the sound proofing base 22. This is why the latter is protected by a plane splash guard 25 constituted and disposed in a similar manner to the cylindrical splash guard 15 described above.

FIG. 2, which may be produced industrially from numerous common parts with those of the valve of FIG. 1, is adapted so that the inlet 30 and the outlet 5 are in alignment. Furthermore, it is adapted for pneumatic control by means of an elastic diaphragm 31 subjected on one side and the other to air pressures introduced at the top and/or at the bottom of a casing 32 in two parts which clamp the diaphragm 31. Such control means are well known and can form part, for example, of an automatic expansion regulating system.

In combination with such an expander, a compensating spring 33 can be mounted, abutting against a shoulder 11a of the sleeve 11 in a sense which is inverse to the force of the inlet pressure which in this instance acts on the closed base of the said sleeve. The sleeve can also be a piston within the pierced ferrule 9. In that case, the spring 33 has a diameter smaller than the ferrule 9 and abuts directly against the upper part of the piston.

In this instance, the cylindrical sound proofing assembly 14 is traversed by an extension 34 of the inlet tube 30 which can be dismantled, this extension being maintained against the latter by a shoulder 34a and clamped by the counter flange 35. Clearance between the sound proofing 14 and the extension 34 prevents the transmission of sound and vibrations to the latter.

The extension 34 itself carries a ferrule 9 on which slides the sleeve 11 attached by a rod 36 to the diaphragm 31. The connection of the extension and the ferrule is ensured by a connector 37 which can be orientated and is soldered to the ferrule and threaded with clearance around the extension 34, fluid tightness being obtained by elastic rings 38 and 39 which permit sliding of the connector 37 along the extension 34 without breaking the fluid tightness as long as the orifices 40 of the latter are not uncovered. The various degrees of freedom which this mounting provides for the ferrule 9 enables the latter to be aligned in the best manner suited to it opposite the sleeve 11, which reduces to the minimum friction during operation and prevents any jamming whatever variations in pressure and temperature prevail. The cover 4 and the body 6 may be provided externally in known manner with a thermally insulating covering 41.

On either figure can be seen a shoulder 42 fixed to the end of the ferrule or strainer 9 and which, in this instance, is a thickening of the support 8 or 38 to which the said strainer is screwed or soldered. This shoulder 42 may, in known manner, constitute or carry a fluid tight seating co-operating with the end of the movable obturator 11 so as to ensure absolute fluid tightness at the end of its travel.

In fact, the sliding clearance between the strainer and the obturator which, for example, is 0.4 millimeters to prevent any jamming between the two pieces, allows a flow of fluid to pass particularly even when all the holes 10 are covered by the obturator.

The residual radial annular flow which results therefrom, between the end of the obturator 11 and of the shoulder 42, could also deteriorate the insulating filling. Consequently, the splash guard 15 must be extended just beyond the plane of the shoulder 42.

What is claimed is:

1. A sound proofed valve for fluid under pressure, comprising a movable obturator for progressively uncovering a series of fluid expansion orifices positioned inside an expansion area, a primary sound proofing means also positioned inside said expansion area and located opposite fluid jets issuing, in operation of said valve, from said orifices, said sound proofing means forming a baffle masking an outlet for an expanded fluid, supplementary sound proofing means being spaced from said primary sound proofing means to form the base of said baffle; a primary permeable splash guard obstacle placed between said orifices and said primary sound proofing means and spaced from said primary sound proofing means; and a supplementary permeable splash guard obstacle positioned between said primary sound proofing means and said supplementary sound proofing means.

2. A valve as claimed in claim 1, wherein said primary and said supplementary sound proofing means are connected to one another and to said expansion area by spacing clips.

3. A sound proofed valve for fluid under pressure, comprising a movable obturator for progressively uncovering a series of fluid expansion orifices positioned inside an expansion area, an inlet tube for directing the fluid under pressure into said expansion area, a second tube which supports a strainer with said expansion orifices therein, a sound proofing means also positioned inside said expansion area and located opposite fluid jets issuing, in operation of said valve, from said orifices, and a permeable splash guard obstacle placed between said orifices and said sound proofing means and spaced from said sound proofing means, said tubes having neither contact with said sound proofing means nor with said permeable splash guard obstacle.

4. A valve according to claim 3, wherein said second tube supports said strainer by means of a connector which can be orientated thereto to permit said strainer to be aligned with said movable obturator.

5. A valve as claimed in claim 3, wherein said strainer is perforated with small holes disposed in a helix.

* * * * *